3,239,572
PROCESS FOR THE RECOVERY OF METHANOL FROM THE HYDROLYSIS PRODUCTS OF METHYL ACETATE
Christoph A. Zinsstag, Visp, Valais, Switzerland, assignor to Lonza Ltd., Gampel, Basel, Switzerland
No Drawing. Filed Sept. 26, 1962, Ser. No. 226,461
Claims priority, application Switzerland, Oct. 11, 1961, 11,804/61
6 Claims. (Cl. 260—638)

The invention relates to the recovery of methanol from methyl acetate.

In contrast to the alkaline hydrolysis of carboxylic acid esters, the hydrolysis in the presence of acid catalysts such as cationic exchange resins or mineral acids is not easily completed. An equilibrium is reached which is essentially a function of the mole ratio of ester to water and depends also to a minor degree on the hydrolysis temperature.

If a complete hydrolysis in the presence of acid catalysts is desired, the reaction mixture must be diluted with large amounts of water; this procedure requires ultimately a complicated dehydration of the obtained acetic acid.

While mixtures of higher alcohols with their esters can be quite easily separated by fractionated distillation, such separation of methanol from methyl acetate is difficult because the two compounds form under normal pressure an anhydrous binary azeotrope which boils at 54° C. and consists of 19.5% by weight of methanol and 80.5% of methyl acetate (mole ratio=36:64).

Various methods have been proposed to separate said azeotrope into its components, for instance, by extractive distillation with water (Patent No. 2,671,052), or with a polyol (Patent No. 2,636,050), or with ethyleneglycol monoethylether (German Patent No. 1,070,165) or by means of a liquid-liquid extraction with concentrated salt solutions (Swiss Patent No. 347,822). Said known methods are expensive and require apparatus of considerable size; the not hydrolyzed ester must be recycled, and the concentration of the obtained acetic acid is, as an average, not more than 25% (see, e.g., Swiss Patent No. 347,822, page 1, line 40).

From Patent No. 2,916,512 it is also known that methanol and pentane from a binary azeotrope which on condensing separates into two phases. However, tests have shown that methylacetate, methanol, and pentane form a ternary azeotrope which on condensing remains a single phase.

It is a principal object of the invention to provide a method for obtaining methanol by the acid hydrolysis of methyl acetate which is more economic and gives better yields than the methods known heretofore.

Other objects and advantages will be apparent from a consideration of the specification and claims.

The invention is based on the discovery that methanol, methyl acetate, an aliphatic hydrocarbon or hydrocarbon mixture having a boiling point of about 10 to 90° C., and water form a quaternary mixture which has an approximately constant boiling point and which separates on condensing from the vapor phase into a layer consisting essentially of the hydrocarbon and an essentially methanolic aqueous layer.

According to the invention, methyl acetate and water are heated in the presence of an acid hydrolysis catalyst such as sulphuric acid, aromatic or aliphatic sulphuric acid, phosphoric acid, ion exchanger in the hydrogen phase, an aliphatic hydrocarbon is added to the boiling mixture, and a quaternary mixture is distilled off which has a substantially constant boiling point and is composed of methanol, methyl acetate, hydrocarbon, and water. The condensate of said vapor mixture separates in an upper layer, which consists essentially of hydrocarbon, and a lower layer which contains essentially the water and methanol. The methanol is then recovered from said lower layer.

The process may be carried out in an apparatus comprising a still, a distillation column, and a condenser. The head of the column is provided with conventional refluxing equipment.

Suitable hydrocarbons are aliphatic hydrocarbons having a boiling point of 10–90° C., preferably 30–50° C., and mixtures of such hydrocarbons. Examples are cyclobutane, pentane, hexane, and isomers thereof such as dimethyl butane, also dimethyl pentane, pentene, and mixtures of such compounds.

Preferably, I use a commercial mixture known as pentane fraction which consists of 75% of n-pentane, 20% of isopentane, and 5% of hexane. With such pentane fraction, I obtain in the distillation of the hydrolysis mixture an azeotrope which has at 700 mm. Hg a substantially constant boiling point of 27° C. and consists of 77.5% of pentane fraction, 8.25% of methyl acetate, 12.8% of methanol, and 1.45% of water.

With advantage, the hydrocarbon is added in such an amount that the temperature of the distillation column, preferably at its mid-height, is below the boiling temperature of the binary azeotrope methanol-methyl acetate, that is below 50° C., but above the substantially constant boiling point of the quaternary azeotrope, which is above 28° C. when using the pentane fraction. All these and the following temperature values relate to an atmospheric pressure of 700 mm. Hg, which is the mean normal atmospheric pressure at Visp, Switzerland, where the tests herein described were made. If other pressures are used, the temperatures must be, of course, adapted accordingly.

The hydrolysis mixture, which consists of methyl acetate, water, and catalyst, is placed in the still and heated therein to boiling. Preferably the reaction mixture has the following composition: 18–36 mol percent methyl acetate, 82–64 mol percent water. The catalyst concentration is selected preferably between 0.2 and 5 mol percent. The methyl acetate is hydrolyzed, and the formed methyl alcohol is distilled off in a distillation column together with hydrocarbon introduced into the head of the column, whereby the quaternary azeotrope is formed; the methyl alcohol is then recovered as lower layer of a two-layer condensate.

Said lower layer which contains the major portion of the methanol, is separated, preferably by decantation, from the upper layer. Subsequently, the small amounts of hydrocarbon and methyl acetate contained in said lower layer are distilled off and recycled into the process. In the distilation of the methanol layer, the water remains in the sump, and substantially anhydrous methanol is withdrawn laterally from the column.

The upper layer, which consists essentially of hydrocarbons, some methyl acetate, and still smaller amounts of methanol, is returned to the hydrolysis mixture.

A preferred procedure, which permits of obtaining a maximum yield of methanol in the lower layer, comprises the following steps:

(a) Hydroylsis under an elevated pressure of, for instance, 0.1 to 3 atm. over atmospheric pressure and corresponding elevated temperatures, whereby the rate of hydrolysis is increased.

(b) Cooling the distillate to a temperature of 0° to −30° C.

The advantages of the novel procedure may be summed up as follows:

(1) The amount of methyl acetate to be recycled is small. Compared with the binary azeotrope methanol-methyl acetate, the quaternary azeotrope contains only about the tenth part of methyl acetate.

(2) The acetic acid accumulating in the still can be brought to the high concentration of about 60%, which facilitates its further use.

(3) The obtained concentrations, particularly that of the acid in the still, are in a range allowing the use of conventional construction materials such as alloy 316 (V4A steel) or copper.

The following examples are given to illustrate the invention.

Example 1

A still equipped with a fractionating column having about 12 theoretical plates was filled with 140 moles (about 11 liter) of 100% methyl acetate, 390 moles (7 liter) of water, and 100 cc. (about 1% by weight) of concentrated sulfuric acid, and the mixture was refluxed. At the head of the column, there was added so much of pentane fraction as to adjust the temperature in the middle level of the column to a temperature below the boiling point of the methanol-methyl acetate, that is below 50° C. At the head of the column, the temperature was 27–28° C. In the still the temperature increased from 55° C. gradually to about 85° C., and the concentration of acetic acid increased steadily while that of the ester decreased (see Table I). After the last residues of the pentane fraction, and the major part of the methanol and methyl acetate had been distilled off, and after the temperature of the still had risen to 104° C., the acetic acid had a concentration of 54.3%.

The quaternary mixture was withdrawn from the head of the column, cooled to —15° C., and the two layers of the condensate were separated at said temperature. The upper layer was recycled, and the lower layer, about 5 percent of the distillate, was withdrawn. It consisted of about 46% of methanol, 40% of methyl acetate, 7% of pentane fraction, and 7% of water. By means of a second column, pentane fraction and methyl acetate were driven off and recycled into the process. The methanol was laterally fractionated out while the water collected in the sump of the still.

There were obtained 4340 g. of methanol, corresponding to a yield of about 97%, calculated on methyl acetate.

The specific gravity of the upper layer was at 20° C. 0.66–0.68, and that of the lower layer 0.85–0.90.

The following Table I gives the components as percentages by weight.

TABLE I

|  | Acetic acid, Percent | Pentane fraction, Percent | Methyl acetate, Percent | Methanol, Percent | Water, Percent |
|---|---|---|---|---|---|
| Contents of still |  |  | 59.7 |  | 40.3 |
| Residue | 54.3 |  | 2.8 | 0.3 | 42.6 |
| Total distillate |  | 79.04 | 15.36 | 5.15 | 0.45 |
| Upper layer |  | 82.5 | 14.4 | 3.0 | 0.1 |
| Lower layer |  | 6.5 | 40.2 | 46.5 | 6.8 |

Example 2

The hydrolysis of the methyl acetate was carried out at a pressure of 1.7 atm. but otherwise as described in Example 1, whereby the temperatures of the column were 10–15° higher and the highest temperature of the still was 106° C.

The rate of hydrolysis was higher, and the hydrolysis itself more complete than in Example 1 and was terminated after 8 hours. The methanol layer in the condenser amounted to 7% of the total distillate; it contained. In addition to 53.89% of methanol, still 10.88% of water, 31.79% of methyl acetate, and at most 3.44% of pentane mixture. The acetic acid in the still had a concentration of about 60%. From this layer, 4320 g. of methanol were recovered by distillation, as described in Example 1, corresponding to a yield of about 96.5%, calculated on methyl acetate.

The following Table II gives the weight proportions of the components in percents.

TABLE II

|  | Acetic acid, Percent | Pentane fraction, Percent | Methyl acetate, Percent | Methanol, Percent | Water, Percent |
|---|---|---|---|---|---|
| Contents of still |  |  | 59.7 |  | 40.3 |
| Residue | 59.6 |  | 1.3 | 0.3 | 38.8 |
| Total distillate |  | 81.03 | 11.5 | 6.61 | 0.84 |
| Upper layer |  | 86.87 | 9.99 | 3.05 | 0.09 |
| Lower layer |  | 3.44 | 31.79 | 53.89 | 10.88 |

Insofar no other statement is made the percentages in this specification are to be understood as by weight.

I claim:

1. A process for the recovery of methanol from the product of the acidic methyl acetate hydrolysis comprising heating a hydrolysis mixture consisting essentially of methyl acetate, water, and an acidic non-volatile catalyst to boiling, thereby partially hydrolyzing said methyl acetate to methanol and acetic acid, adding to said boiling mixture at least one aliphatic hydrocarbon having a boiling point of about 10 to 90° C., distilling off in a distillation zone a quaternary azeotrope of methanol methyl acetate, water, and said hydrocarbon, which azeotrope has a constant boiling point, condensing the distillate in two separate layers, the upper layer consisting essentially of said hydrocarbon, the lower layer containing the major portion of water and the formed methanol, separating said layers, and distilling off methanol from the lower layer.

2. The process as claimed in claim 1 wherein said hydrocarbon has a boiling point of 30 to 50° C.

3. The process as claimed in claim 1 wherein the hydrolysis and distillation are carried out at a pressure of about 1.1 to 4 absolute.

4. The process as claimed in claim 1 comprising adding an amount of said hydrocarbon sufficient to maintain in said distillation zone a temperature which is below the boiling point of the binary azeotrope methyl acetate-methanol and above the boiling point of the quaternary azeotrope methyl acetate-methanol-water-hydrocarbon.

5. The process as claimed in claim 1 comprising condensing the vapors of the distilled quaternary azeotrope at a temperature of about 0 to —30° C.

6. The process as claimed in claim 1 comprising returning said upper layer to the hydrolysis mixture.

(References on following page)

References Cited by the Examiner

UNITED STATES PATENTS

| | | |
|---|---|---|
| 1,847,597 | 3/1932 | Charles. |
| 2,561,680 | 7/1951 | Willke et al. |
| 2,650,249 | 8/1953 | Mention et al. _____ 260—643 |
| 2,865,955 | 12/1958 | Ascherl et al. _____ 260—643 |
| 2,916,512 | 12/1959 | Fisher et al. _____ 260—486 |
| 2,936,321 | 5/1960 | Mercier _____ 260—643 |
| 3,011,954 | 12/1961 | Halpern. |

ROBERT F. BURNETT, *Primary Examiner.*

NORMAN YUDOFF, *Examiner.*